United States Patent Office 2,706,311
Patented Apr. 19, 1955

2,706,311
PROCESS FOR PREPARING FOAMED STRUCTURES

Jack R. Durst, Columbus, and Henry A. Pace, Akron, Ohio, assignors, by mesne assignments, to The Goodyear Tire & Rubber Company, a corporation of Ohio No Drawing. Application May 4, 1951,
Serial No. 224,674

11 Claims. (Cl. 18—48)

This invention relates to a procedure for obtaining a foamed resinous structure and is particularly concerned with a process for filling normally inaccessible places with foam.

Heretofore many structures have been built which have sought a maximum condition of rigidity coupled with minimum density. In an effort to attain optimum conditions of strength and weight, various means have been used to create a structure with a foamed interior composed of resinous materials. These structures have been widely used in the production of component parts, for example, in the manufacture of airplanes and guided missiles.

Due to the high viscosity of most foamable materials, employing a chemical blowing agent, it has been extremely difficult and even impossible to place the foamable mix on the bottom of the structure so that the foaming can proceed upward without entrapment of air. An example of this difficulty is encountered in the production of hollow, foam-filled propeller blades for airplanes and other structures having compound curvatures. The fact that most foamable materials are difficult to control has created a problem in preventing liberation of gases prior to placement of the foamable mixture. These problems are so acute in many applications that structural strength has been sacrificed in order to obtain light weight by building structures in sections which are united later, instead of building complete units originally.

It is therefore an object of this invention to provide a process for controlling the release of gases in foamable mixtures and to achieve uniformity of foaming in normally inaccessible places.

It is a further object of this invention to provide a process for preparing foam-filled structures wherein a substantially homogeneous foamed interior is obtained.

Still another object of the invention is to provide foamable material in the form of pieces or shapes which can be placed in a cavity and then caused to foam.

In the practice of this invention, a foamable material is prepared by any of the customary methods, as by mixing a resinous composition with a blowing agent. This foamable mixture is prepared in a fluid condition and the fluid is then poured into a mold which may be divided into chambers of desired size, as will be described more particularly hereinafter. The mixture is cooled to or below the temperature at which it becomes solid and at which temperature the blowing agent is inactive and at which temperature no foaming can occur. This cooling can be accomplished by any of the customary methods; for example, small quantities of foamable material can be cooled by a Dry Ice-acetone bath and commercial batches can be cooled by the use of a cold brine bath.

The mold can be of any desired shape or size and can be divided into cubicles or chambers as mentioned. The foamable material which, at this point, is a viscous liquid, is poured into the mold and cooling continued until the desired temperature is reached. The pieces or shapes thus formed may be stored in the molds until needed or they may be removed from the mold and stored under refrigeration, the mold then being used for the preparation of additional material.

The pieces of foamable material can be stored for days, weeks, or even months at low temperatures with no loss of ability to produce foamed structures equal in quality and quantity to those generated directly after preparation of the foamable mixture. Foaming can be accomplished by dropping pieces of the foamable mixture into the space which it is desired to fill with foam and then raising the temperature to the point at which the blowing agent in the mixture becomes active. The the foamable material is supplied in quantity sufficient to generate the requisite volume of foam and foaming thereof is continued until the gas-evolving components are exhausted. Should the cavity be so large or of such complex shape that a one-step foaming operation is impractical, foaming may be conducted by stages so that only a portion of the cavity is filled at one time. Thus, after the first foam has gelled, additional pieces of foamable material can be dropped in and another section of the cavity filled and so on until the entire cavity has been filled with foam. The interfacial bond between the successive increments of foam is as strong as the foam itself.

By the practice of this invention it is possible to generate a foam which is uniform with respect to density and pore size and which can be used to fill a space without leaving large voids in the foam. Heretofore, when it was desired to fill a complex cavity, such as that encountered in structures having compound curves, the liquid foamable composition would trap large bubbles of air in the cavity and these bubbles would remain in the finished product, thus introducing points of weakness, either in the interior of the foamed mass or at the boundaries thereof where the foam adheres to the confining walls. Also, in such complex structures, it is difficult to induce the foam to distribute itself where needed since a sharp angle or curve tends to prevent progress of the foamable mixture or of the foam itself. When the present invention is employed, however, these difficulties are readily overcome since foamable material in the form of the above-described pieces or shapes may be readily placed where needed to fill a portion of the cavity and, simultaneously or subsequently, additional foamable material may be placed where needed to fill another portion of the cavity. There is no possibility of trapping or occluding air in any portion of the cavity so as to leave a large void and thus weaken the finished structure because of the lack of adhesion at the point where the void exists.

In order to more fully illustrate the invention, the following examples are included. These examples are intended to be illustrative only and not as limitations on this invention.

Example 1

A foamable mixture was prepared from the following:

| | Grams |
|---|---|
| Glycerol phthalate adipate resin | 50 |
| Meta tolylene diisocyanate | 46 |

The acid number of the glycerol phthalate adipate resin can vary from 15 to 65, but the best foams have been prepared from a resin with an acid number of about 40 to 45. The hydroxyl number can range from 420 to 550 but the best foams have been prepared from a resin whose hydroxyl number was about 465. Small cakes of foamable material prepared therefrom may be kept in a frozen state for hours, days, or even months without any deleterious effect thereon.

A test panel was prepared by foaming a portion of this material between two confining skins after the foamable mixture had been frozen for six hours. This panel required the same amount of foamable material as a similar test panel prepared from the same foamable material, but foamed immediately after preparation of the mixture. The panels were of the same dimensions and foamed to the same density in each structure.

Example 2

As a further test of this process, a wing structure for a guided missile was prepared by foaming a foamable mixture, prepared as in Example 1, within the space between the upper and lower skin surfaces of the wing. The main body of the wing was filled by two consecutive foamings while the leading edge was filled with one charge of foamable mixture. A strong, rigid, unitary structure resulted. Prior to the use of this invention, it had been impossible to interfoam these wing structures because the viscous mixture would trap air as it was being poured into the space to be foam-filled, thus resulting in a weak, heterogeneous structure."

Example 3

The foaming mixture of Example 1 was used to fill completely one-piece hollow propeller blades with foam, by utilizing the teaching of this invention. A similar uniform interiorly foamed structure resulted.

Example 4

The invention is especially useful in making repairs. Thus, an interfoamed radar canopy was fractured with a sharp object so as to provide an irregular void for repair. Small solid pieces of the solidified mixture, prepared as in Example 1, were dropped into the ragged hole and allowed to foam. The material can be added progressively so as to avoid waste. After foaming was completed, the canopy surface was sanded to create a uniform contour. Tests have indicated that such repairs do not materially weaken the structure and do not interfere with electrical transmission.

Portions of foamable mixture have been stored for three months at minus 40° C. with no loss in ability to produce foams, equal in quality and quantity to those generated directly after preparation of the foaming mixture.

The practice of this invention can be applied to any structure where a light-weight foam coupled with great structural strength is desired. For example, foams are well-known as thermal insulators, and, therefore, this invention can be used in preparing insulating panels or in insulating by filling the interstices of completed structures.

While certain representative embodiments and details have been shown for the purpose of illustrating this invention, it will be apparent to those skilled in this art that various changes and modifications may be made therein without departing from the spirit or scope of the invention.

We claim:

1. The method of making a foamed structure which comprises freezing a gas-evolving foamable resinous material, placing a small quantity of said material while in a solid state within an interstice, and raising the temperature of said material to cause foaming.

2. The method of making a structure with a foam-filled interior portion which comprises freezing a normally fluid gas-evolving foamable resinous material, placing a small quantity of said material while in a solid state within the interstice to be filled, heating said material until the foaming action is exhausted, and repeating said process until the said interior portion is completely filled.

3. The method of making a structure with a foam filled interior portion which comprises freezing a normally fluid alkyd resin organic diisocyanate foamable composition, placing a small quantity of said material while in a solid state within the interstice to be filled, heating said material until the foaming action is exhausted and repeating said process until the said interior portion is completely filled.

4. The method of making a foamed structure which comprises freezing a fluid foamable resinous composition which contains a gas-evolving agent, placing a small quantity of said material while in a solid state within an interstice to be filled, foaming said composition by allowing the temperature to rise to the point at which gas is evolved from the composition, and repeating said process until the said interstice is completely filled.

5. The method of making a foamed structure which comprises freezing a fluid alkyd resin organic diisocyanate foamable composition, placing a small quantity of said material while in a solid state, within an interstice to be filled, foaming said composition by allowing the temperature to rise to the point at which gas is evolved from the composition, and repeating said process until the said interstice is completely filled.

6. A method of making an interfoamed structure having compound curves and embodying outer confining skins defining an interstice therebetween, said method comprising the steps of (1) preparing a foamable mixture by mixing an alkyd resin and an organic diisocyanate, (2) freezing said alkyd resin diisocyanate mixture until is becomes a solid, (3) introducing said alkyd resin diisocyanate mixture while in the form of small solid chunks into said interstice to be foam filled, (4) elevating the temperature to restore fluidity to said alkyd resin diisocyanate mixture, and (5) foaming said alkyd resin diisocyanate mixture.

7. A method of making a foam structure which comprises freezing a fluid alkyd resin material having an acid number between 15 and 65 and a hydroxyl number between 420 and 550 and modified by an organic diisocyanate blowing agent, placing a small quantity of said modified material while in the solid state within an interstice to be filled having compoundly curved sides, melting said solid material to provide a foaming surface with no air pockets, foaming said composition by raising the temperature to the point at which gas is evolved from the composition, and repeating said process until the said interstice is completely filled.

8. A method of filling a structure with resinous foam, said structure having a restricted access into an interstice which causes a tendency to trap air when a foamable material is foamed in place therein, comprising the steps of freezing a normally fluid alkyd resin material having an acid number between 15 and 65 and a hydroxyl number between 420 and 550 and modified by an organic diisocyanate blowing agent, placing a small quantity of said modified material while in the solid state within an interstice to be filled having compoundly curved sides, melting said solid material to provide a foaming surface with no air pockets, foaming and gelling said composition by raising the temperature to the point at which gas is evolved from the composition, and repeating said process until the said interstice is completely foam filled.

9. A method of making an interfoamed structure which comprises freezing to the solid state a normally fluid composition capable of being foamed while in the fluid state, placing pieces of said frozen composition within an interstice and raising the temperature of said solid composition to cause foaming thereof within said interstice so that no air or gas is pocketed by the foam and setting said foam so as to fill said interstice uniformly.

10. A method of making an interfoamed structure which comprises freezing to the solid state a normally fluid mixture of a glycerol phthalate adipate resin having an acid number between 15 and 65 and a hydroxyl number between 420 and 550 and metatolylene diisocyanate, placing pieces of said frozen mixture within an interstice, melting said solid mixture while in the interstice to provide a foaming surface with no air pockets therebehind, foaming said mixture by raising the temperature to the point at which gas is evolved therein and foam is generated, and maintaining said mixture at a foamable temperature until the evolution of gas is completed and the foam has set.

11. A method of making an interfoamed structure which comprises freezing to the solid state a normally fluid mixture of a glycerol phthalate adipate resin having an acid number between 15 and 65 and a hydroxyl number between 420 and 550 and metatolylene diisocyanate, placing pieces of said frozen mixture within an interstice, melting said solid mixture while in the interstice to provide a foaming surface with no air pockets therebehind, foaming said mixture by raising the temperature to the point at which gas is evolved therein and foam is generated, maintaining said mixture at a foamable temperature until the evolution of gas is completed and the foam has set, placing more pieces of the frozen mixture in the interstice and repeating said process until the interstice is completely filled with foam.

References Cited in the file of this patent

UNITED STATES PATENTS

| | | |
|---|---|---|
| 1,776,366 | Novotny | Sept. 23, 1930 |
| 2,503,209 | Nyquist | Apr. 4, 1950 |
| 2,577,279 | Simon | Dec. 4, 1951 |

FOREIGN PATENTS

| | | |
|---|---|---|
| 25,977/30 | Australia | Feb. 26, 1931 |

OTHER REFERENCES

McPherson et al.: Food Industries, September 1948, pp. 95–97, 99–192B (volume pages 1289–1291).

German Plastics Practice, by De Bell et al., pub. 1946 by De Bell & Richardson, pp. 463–465.

Plastics (of London), vol. 15, April 1950, pp. 93–95.